United States Patent [19]

McEachern, Jr.

[11] Patent Number: 4,777,796
[45] Date of Patent: Oct. 18, 1988

[54] HEAT RECOVERY MUFFLER SYSTEM

[75] Inventor: J. Albert McEachern, Jr., Mobile, Ala.

[73] Assignee: Teledyne Industries, Inc., Los Angeles, Calif.

[21] Appl. No.: 23,534

[22] Filed: Mar. 9, 1987

[51] Int. Cl.⁴ .................... F01N 3/04; F01N 5/02
[52] U.S. Cl. .................... 60/310; 60/320; 165/111; 165/104.31
[58] Field of Search ............. 60/310, 320; 165/104.31, 111

[56] References Cited

U.S. PATENT DOCUMENTS

| 2,726,584 | 12/1955 | Marx . | |
|---|---|---|---|
| 3,092,206 | 6/1963 | Moreau . | |
| 3,282,047 | 11/1966 | Wertheimer | 60/310 |
| 3,630,030 | 12/1971 | Wagner . | |
| 4,100,994 | 7/1978 | Stuart . | |
| 4,167,987 | 9/1979 | Turner . | |
| 4,301,652 | 11/1981 | Sohda et al. . | |

FOREIGN PATENT DOCUMENTS

| 3150148 | 6/1983 | Fed. Rep. of Germany | 60/310 |
|---|---|---|---|
| 666280 | 6/1979 | U.S.S.R. | 60/310 |
| 775600 | 5/1957 | United Kingdom | 165/104.31 |

Primary Examiner—Albert W. Davis, Jr.
Attorney, Agent, or Firm—Gifford, Groh, VanOphem, Sheridan, Sprinkle and Dolgorukov

[57] ABSTRACT

An improved muffler system for internal combustion engines recovers heat energy of exhaust gases by spraying a fluid into the exhaust stream in order to absorb the heat energy of the exhaust gases. The heated fluid is collected at the bottom of the muffler vessel and the stored heat energy is transferred to a second fluid via a counter-current liquid to liquid heat exchanger. The heat energy from the second fluid is then removed and utilized, for example, to condition passenger spaces.

3 Claims, 1 Drawing Sheet

U.S. Patent    Oct. 18, 1988    4,777,796
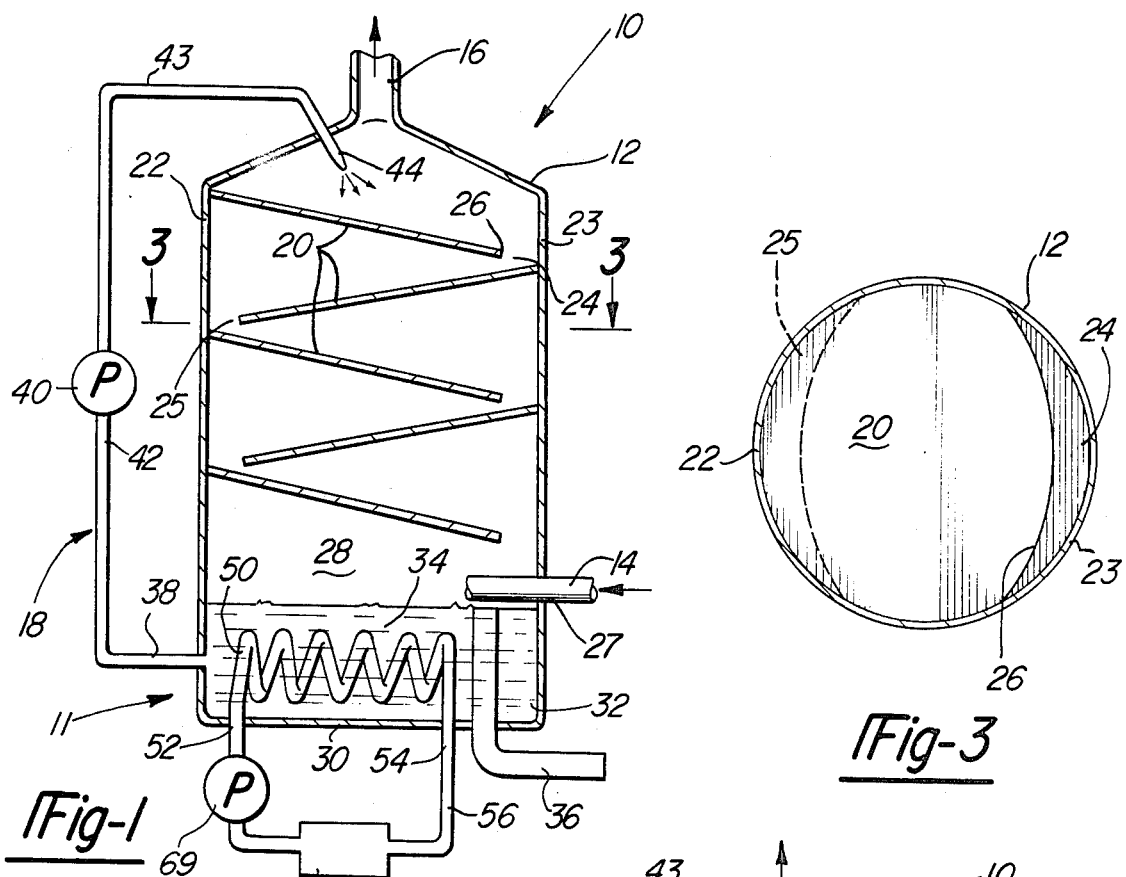
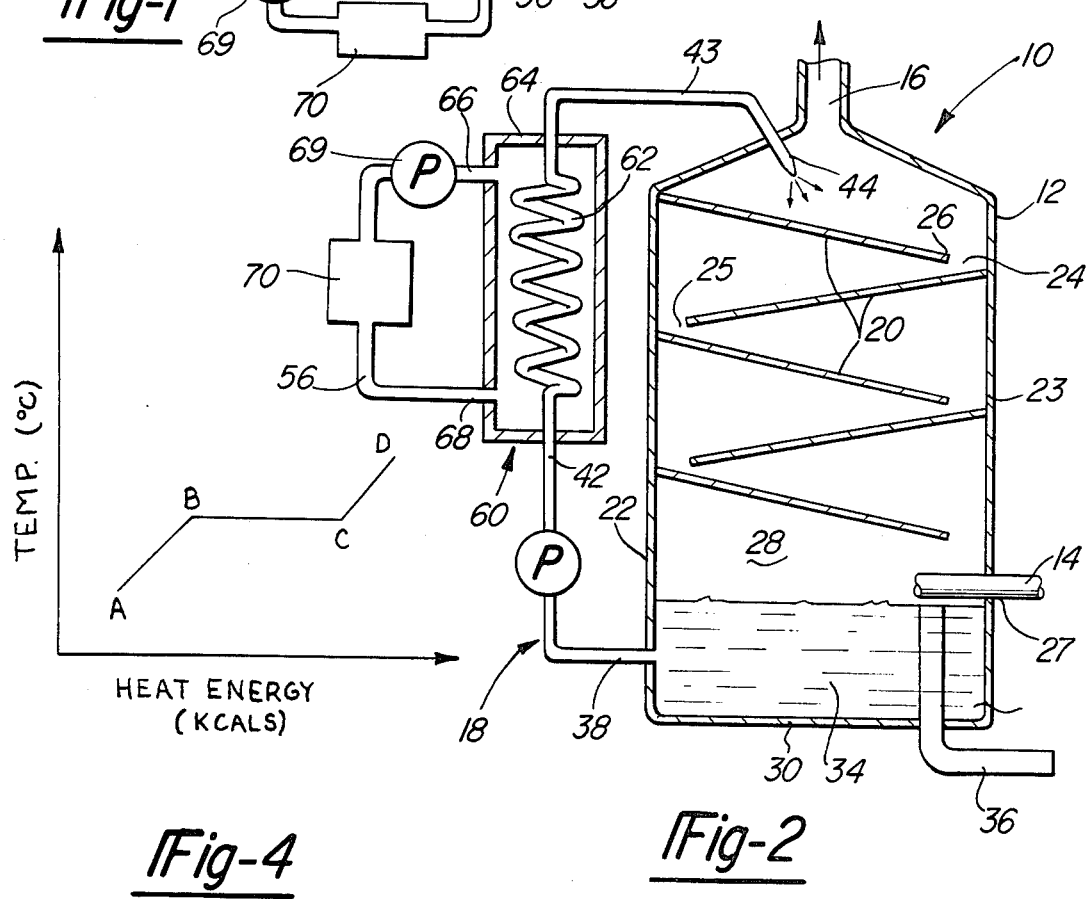

HEAT RECOVERY MUFFLER SYSTEM

BACKGROUND OF THE INVENTION

1. Field of Invention

This invention relates to a muffler system for internal combustion engines and in particular to a muffler system employing a heat exchanger to recover and utilize heat energy from exhaust gases which energy is otherwise lost to the atmosphere.

2. Description of the Prior Art

Internal combustion engines have many applications; most commonly in the automobile. In an automobile and in other uses of internal combustion engines a muffler system is connected to the exhaust port of the engine. Heat of combustion is generally dissipated to a coolant fluid which circulates around the engine and, in turn, releases the heat to the atmosphere via a radiator. Additional heat energy is simply lost to the atmosphere through escaping hot exhaust gases.

It is desirable to recover and utilize the heat energy that would otherwise be lost to the atmosphere. A conventional automobile heater does this to a certain extent by diverting the heated coolant fluid from the engine to the passenger compartment where a heat exchanger releases the heat to warm the passengers. However, the heat lost by the escape of exhaust gases is not recovered at all.

Presently known muffler devices generally have the sole goal of reducing noise. One means of achieving this is by inserting baffles which lengthen and deflect the path of exhaust gases. Another means is by cooling the gases since the wavelength of the sound explosions is dependant on the ambient temperature according to the formula:

$$\text{wavelength} = \frac{\text{speed of sound}}{\text{frequency}}$$

where the speed of sound is directly proportional to the ambient temperature. (See eg. U.S. Pat. No. 3,630,030 issued to W. M. Wagner.) Thus, as the temperature is reduced, the speed of sound is reduced and the wavelength is reduced, enabling a shorter attenuation path required to reduce the noise.

Cooling of exhaust gas has been achieved by expanding it into various muffler chambers and by spraying the gas with a coolant fluid which then transfers the heat to the atmosphere. The ability of a coolant fluid to remove heat from the exhaust depends in part upon the surface area of coolant exposed to the gas. Known devices disperse the coolant in small droplets in an attempt to maximize the surface area exposed to collect heat.

Thus, presently known muffler devices have a primary goal of reducing engine noise by using baffles or by cooling the gases. However, the presently known cooling means have the disadvantage of wasting large amounts of heat energy which are lost to the atmosphere.

SUMMARY OF THE PRESENT INVENTION

The present invention overcomes this disadvantage through a device that efficiently recovers the heat contained is hot exhaust gases. The present invention comprises a generally cylindrical muffler vessel. The vessel is positioned vertically with the exhaust gases entering at the lower end and exiting at the upper end. Inside the vessel are several obliquely angled baffle plates. Every other baffle plate attaches to the inside wall of the vessel at one side and slopes downwardly toward, but does not connect to, the opposite side. Each alternate baffle plate attaches to the opposite side and slopes toward the first side. If desired, the baffle plates may contain openings for enhanced attenuation.

A nozzle is inserted into the vessel near the upper and and it sprays water or other coolant fluid down onto the first baffle plate. The fluid wets out and flows down the sloping baffle plate to the edge where it drops onto the next baffle plate. On this second baffle plate, the fluid flows the opposite way down the slope to the third baffle plate, and so on. After the last baffle plate, any fluid remaining drops down into a reservoir at the bottom of the vessel. Fluid is pumped from this reservoir, through a conduit, back to the nozzle. A drain is provided to allow excess fluid to flow out of the vessel, if the fluid in the reservoir exceeds a predetermined level.

A liquid to liquid heat exchanger is provided either internally or externally to the vessel. In the internal exchanger a tube is coiled around in the reservoir at the bottom of the vessel. A second fluid, which is initially cooler than the reservoir fluid, is circulated through this tube. The heat contained in the reservoir fluid is transferred to the second fluid by repeated exposure through the tube. In the external exchanger embodiment, the conduit from the reservoir to the nozzle contains a coiled, heat exchanging section. A hollow jacket encloses this coiled section and a second fluid, initially cooler than the reservoir fluid, is circulated through the jacket. The reservoir fluid transfers heat to the cooler second fluid by repeated exposure through the coiled, heat exchanging section. In both cases, the second fluid, after being heated, is conducted to a location where the recovered heat energy can be utilized.

The present device realizes its energy recovery efficiency due to the repetitive re-exposure of fluid to the exhaust gas stream, and the large surface area of fluid exposed to the gas by wetting the baffle plates with the fluid. The fluid cools the gases and retains the heat energy by the process of boiling as well as by a change in the temperature of the fluid. Thus, both latent heat and sensible heat are recovered.

BRIEF DESCRIPTION OF THE DRAWINGS

The present invention will be more fully understood by reference to the following detailed description of the preferred embodiment when read in conjunction with the accompanying drawing, in which like reference characters refer to like parts throughout the several views, and in which:

FIG. 1 is a side cross sectional view of one embodiment of the present invention;

FIG. 2 is a side cross sectional view of a different embodiment of the present invention;

FIG. 3 is a top cross sectional view of the embodiment of FIG. 1, taken substantially along line 3—3 of FIG. 1; and FIG. 4 is a graph of the temperature of a fluid exposed to increasing amounts of heat energy.

DETAILED DESCRIPTION OF THE PREFERRED EMBODIMENT

Referring first to FIGS. 1 and 3, a heat recovery muffler device 10 is there shown embodying an internal heat exchanger 11. The device comprises generally a vessel 12, an exhaust inlet 14, an exhaust outlet 16, and a fluid recycling means 18.

The vessel 12 is shaped generally like an upright cylinder having diametrically opposed walls, 22, 23, and containing a plurality of baffle plates 20. The baffle plates 20 are obliquely angled with respect to the vessel walls 22, 23. Every other baffle plate 20, is attached to one vessel wall 22 and slopes downwardly toward the opposite wall 23, but stops before contacting it, thus, leaving a space 24 between the edge 26 of the baffle plate 20, and the opposite wall 23. Each alternate baffle plate 20 attaches to the opposite wall 23 and slopes toward the first wall 22, leaving a similar space 25. The baffle plates 20 may contain holes (not shown) to attenuate noise or to alter the flow of fluid.

The lower interior portion of the vessel 12 is devoid of baffle plates 20, but contains an exhaust inlet 14 consisting of a through pipe 27 sealed at the vessel wall 22 and continuous with the engine exhaust manifold (not shown). The through pipe 27 opens to the interior 28 of the vessel 12. The interior 28 is continuous, via successive spaces 24, 25 with the exhaust outlet 16 at the top of the vessel 12. The outlet means 16 is continuous with the atmosphere through appropriate pipe sections (not shown). The exhaust gases flow in a stream from the exhaust inlet 14, weaving around the baffles 20 through the spaces 24, 25 and finally exiting at exhaust outlet 16. "The exhaust inlet pipe 27 effectively divides the interior of the vessel into an upper and a lower portion."

The bottom of the cylindrical vessel 12 is sealed off by a bottom plate 30, which, together with the vessel walls 22, forms a reservoir 32 in the lower interior portion in which coolant fluid 34 may collect. When the amount of fluid 34 in the reservoir 32 exceeds a predetermined level, the excess flows out through a drainpipe 36 embedded in the plate 30.

Below the predetermined fluid level and protruding from the vessel wall 22 is fluid outlet 38. The fluid outlet 38 is connected to the inlet of a pump 40 by appropriate conduit means 42. Additional conduit means 43 connects the output of the pump 40 to a nozzle 44 located in or near the exhaust outlet 16 at the top of the vessel 12. During operation, the pump 40 circulates coolant fluid 34 from the reservoir 32, through the conduit means 42 to the nozzle 44, where it is sprayed into the interior 28 and onto the first baffle plate 20. The fluid 34 then flows down the sloping baffle plate 20 to the edge 26 where it encounters the exhaust gas stream in the space 24. The fluid 34 drops through the exhaust stream and onto the next baffle plate 20. This process continues until the fluid 34 is vaporized by the exhaust gases or returns to the reservoir 32.

FIG. 1 illustrates the device 10 with an internal heat exchanger 11, comprising a tube 50 coiled around in the reservoir 32. The tube 50 has an inlet 52 and an outlet 54 through the bottom plate 30 or, alternatively through the vessel wall 22 or 23. The tube 50, and inlet 52 and outlet 54 partly form the walls of a container that encloses a second fluid 56 and isolates it from the first fluid 34 in the reservoir 32. Preferably, the inlet 52 is in the proximity of the fluid outlet 38 and the outlet 54 is in the proximity of the edge 26 of the last baffle plate 20. This arrangement produces the most efficient counter-current heat exchange when the second fluid 56 flows through the tube 50 from the inlet 52 to the outlet 54.

Referring now to FIG. 2, the device 20 is there shown in a different preferred embodiment utilizing an external heat exchanger 60. Many parts of FIG. 2 have the same structural and functional purpose as in the embodiment of FIG. 1 and, therefore, are not described again in any detail. These parts have the same reference characters as in FIG. 1. The remaining parts of the external heat exchanger 60 are given different reference characters and are described below.

The conduit 42 which recycles fluid 34 from the reservoir 32 to the nozzle 44 forms a coiled section 62 at some point along its length. Surrounding the coiled section 62 is a hollow jacket 64 comprising top, bottom and side sections. Sealed at their respective joints with the conduit 42, as well as with the inlet 66 and the outlet 68. The hollow jacket 64, inlet 66 and outlet 68 partly form the walls of a container that encloses the second fluid 56 and the conduit means 42 isolates the second fluid 56 from the first fluid 34. Preferably, the inlet 66 is disposed at the top end of the jacket 64 nearest the nozzle 44, while the outlet 68 is located at the lower end of the jacket 64, nearest the fluid outlet 38 from the reservoir 32. This arrangement produces the best counter-current heat exchange when the second fluid 56 flows through the jacket 64 from the inlet 66 to the outlet 68 around the coiled section 62.

Having described the embodiments of the present invention, its operation can be understood with the following description. Hot exhaust is led from the engine exhaust manifold directly to the exhaust inlet 14 by appropriate pipe means (not shown), and is introduced to the interior 28 of the vessel 12. The hot exhaust stream flows up through the interior 28 according to the sinuous path defined by the alternating baffle plates 20 and the spaces 24, 25 until it eventually escapes through exhaust outlet 16 to the atmosphere. Throughout the interior 28 and particularly at each space 24 and along each baffle plate 20, the hot exhaust stream encounters cooling water or fluid 34. The fluid 34 absorbs and stores the heat of the exhaust gases in a manner to be described in more detail presently. Thus, the gases escape to the atmosphere at a reduced temperature having been stripped of their heat energy by transfer to the fluid 34.

The coolant fluid 34 absorbs the heat energy transferred by the exhaust gases in two ways. Referring now to FIG. 4, a graph is there shown illustrating the two types of heat energy stored by the coolant fluid 34. As the fluid 34 is warmed, it absorbs a fixed amount of heat energy according to its heat capacity. For example, a kilogram of water absorbs and stores 1 kcal of heat for each degree Celsius it is raised. This is sometimes referred to as sensible heat and corresponds to the segment AB on the graph of FIG. 4. Additionally, some of the fluid 34, having reached the temperature at point B, will be vaporized, absorbing additional heat energy, known as the latent heat or heat of phase transformation. In the case of water, a kilogram at 100 degrees Celsius will absorb an additional 540 kcals of heat to convert it to steam. This occurs without any additional rise in temperature and corresponds to segment BC of FIG. 4. The fluid 34 may absorb further heat energy by super heating according to the heat capacity of the fluid vapor. This is illustrated by segment CD of FIG. 4.

The heat energy stored in the fluid 34 is transferred to the second fluid 56 by means of a conventional counter-current heat exchanger 11, 60 either within the vessel 12 (FIG. 1) or external to the vessel 12 (FIG. 2). The quantity of heat transferred depends in part on the surface area and conductivity of the coiled tube 50, 62 and on the temperature gradient between the fluid 34 and the second fluid 56. The surface area of the tube is maximized by coiling it and it is made of a material suitable for efficiently conducting heat from one side of the tube wall to the other.

To maintain the most favorable temperature gradient, the fluids flow generally in opposite directions within their respective enclosures. Using the example of the external heat exchanger 60, the fluid 34 is hottest as it enters the coiled section 62 near the bottom of the jacket 64, and cools as it progresses upward through the jacket 64 transferring its heat energy to the second fluid 56. Second fluid 56 generally flows through the jacket 64 from the top, near inlet 66, to the bottom, near outlet 68, oppositely to the flow of fluid 34. In this way, the second fluid 56 is warmest at the outlet 68, which is near the beginning of coiled section 62 where the conduit 42 contains fluid 34 at its hottest point. Conversely, as the fluid 34 travels upward through the coiled section 61 it transfers heat to the second fluid 56 and becomes cooler. It is coolest near the top of coiled section 62 where the second fluid 56 is also coolest, thus preserving the temperature gradient necessary for heat transfer. The same counter-current principle operates in the internal heat exchanger 11 but to a lesser extent since the hottest and coolest points of the fluid 34 in the reservoir 32 are less well defined.

In both the internal and external embodiments, a pump 69 forces the second fluid 56 carrying the heat energy from the outlet 54, 68 to a location where it can be utilized; for example, by heater 70 to condition passenger spaces.

To maximize heat transfer, the tube 50 or the coiled section 62 is preferably made of a material which efficiently conducts heat energy through its walls, and the arrangement of tube 50 or coiled section 62 is designed to maximize the surface area of the tube or conduit exposed to the surrounding fluid, so as to maximize the transfer of heat energy. Conversely, to minimize unwanted dissipation of heat energy in the various other conduits insulating materials may be used.

Having described my invention, however, many modifications thereto will become apparent to those skilled in the art to which it pertains without deviation from the spirit of the invention as defined by the scope of the appended claims.

I claim:

1. A heat recovering muffler system for an internal combustion engine producing heated exhaust gas, said muffler system comprising:
    a vessel which comprises a top, a bottom and diametrically opposed wall sections defining an interior; an exhaust inlet disposed in one of said diametrically opposed wall sections and extending into said interior and dividing said interior into upper and lower portions and providing gaseous communication from the engine to said interior; and an exhaust outlet disposed in the top of said vessel and providing gaseous communication from the upper interior portion to the atmosphere;
    means for absorbing heat energy from said exhaust gas as said exhaust gas flows along a path within said interior from said exhaust inlet to said exhaust outlet;
    said vessel forming a reservoir in said lower portion beneath said exhaust inlet;
    a first fluid disposed in said reservoir and capable of absorbing and storing heat energy;
    means for maintaining said first fluid at or below a predetermined vertical position in said lower portion of said vessel,
    wherein said exhaust inlet is positioned above said predetermined vertical position in said lower portion of said vessel,
    nozzle means for introducing said first fluid into said upper interior portion of said vessel;
    conduit means connecting said nozzle means to said reservoir;
    pump means for recycling said first fluid from said reservoir to said nozzle means;
    means for repeatedly exposing said first fluid to the path of said exhaust gas comprising;
    baffle means including baffle plates, disposed in said interior, said baffle means defining a sinuous exhaust gas path as well as a reverse direction flow path for said first fluid whereby at each baffle plate said first fluid is again exposed to said exhaust gas path;
    means for transferring said absorbed heat energy to a location where it can be utilized comprising;
    a second fluid system including a second fluid capable of absorbing energy, fluid container walls isolating said second fluid from said first fluid with said fluid container walls being in intimate contact with said first fluid and said second fluid and constituting a heat exchanger therewith, second pump means for circulating said second fluid.

2. The heat recovering muffler system of claim 1 wherein said container walls comprise a continuous tube inserted in said reservoir.

3. The heat recovering muffler system of claim 1 wherein said container walls comprise a tube forming part of said conduit means, a hollow jacket surrounding said tube forming part said conduit means, said jacket forming a reservoir, means for introducing said second fluid into said jacket and into heat transmitting relationship with said tube and means for removing said second fluid from the latter said reservoir.

* * * * *

UNITED STATES PATENT AND TRADEMARK OFFICE
CERTIFICATE OF CORRECTION

PATENT NO. : 4,777,796
DATED : 10/18/88
INVENTOR(S) : J. Albert McEachern, Jr.

It is certified that error appears in the above-identified patent and that said Letters Patent is hereby corrected as shown below:

Col. 2, line 7, delete "and" and insert --end--;

Col. 3, lines 28, 29, remove the quotation marks;

line 41, delete "connects' and insert --connect--;

line 66, delete "20" and insert --10--;

Col. 4, line 11, delete "sections. Sealed" and insert --sections, sealed--.

Signed and Sealed this

Twenty-third Day of May, 1989

*Attest:*

DONALD J. QUIGG

*Attesting Officer*      *Commissioner of Patents and Trademarks*